UNITED STATES PATENT OFFICE.

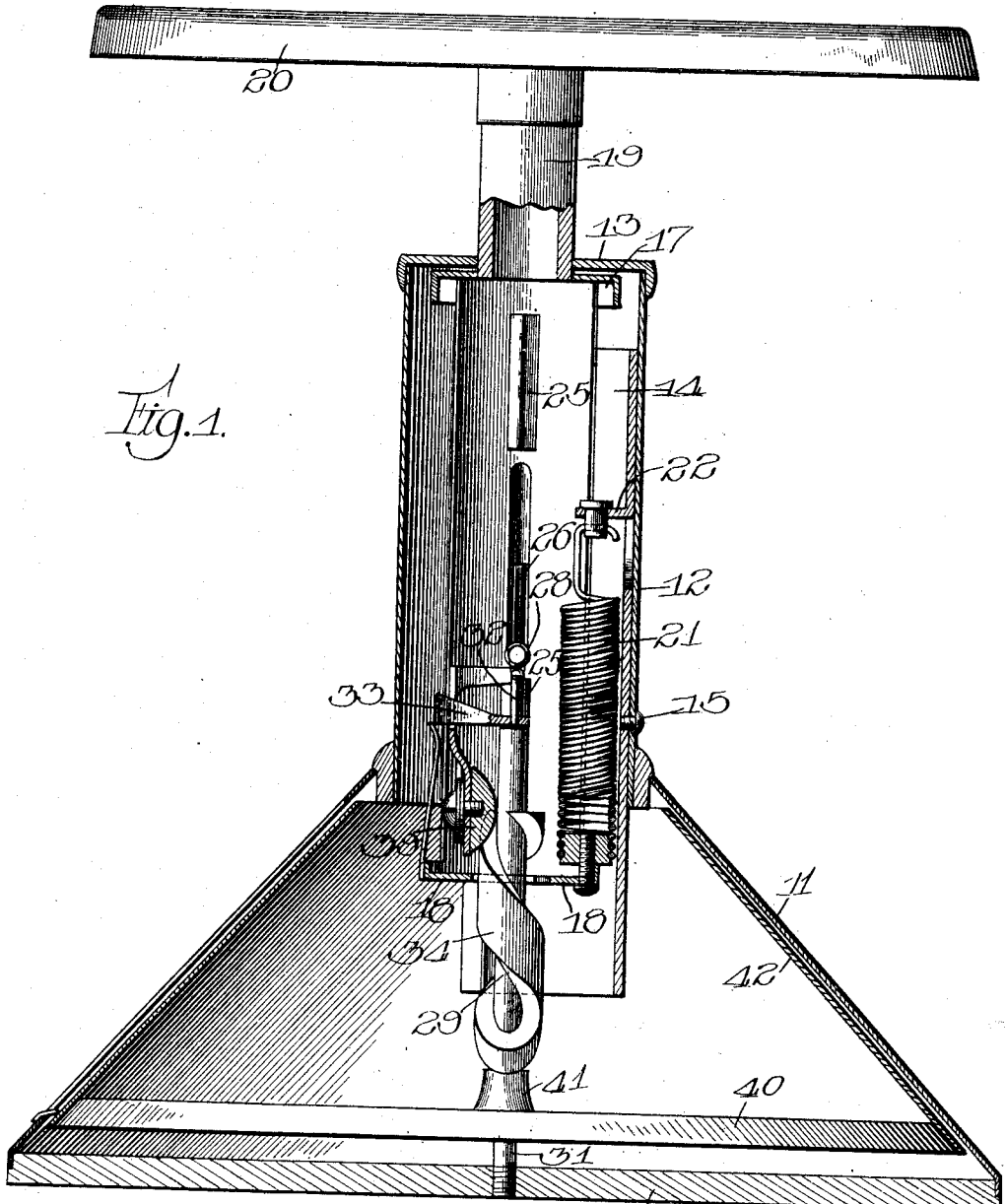

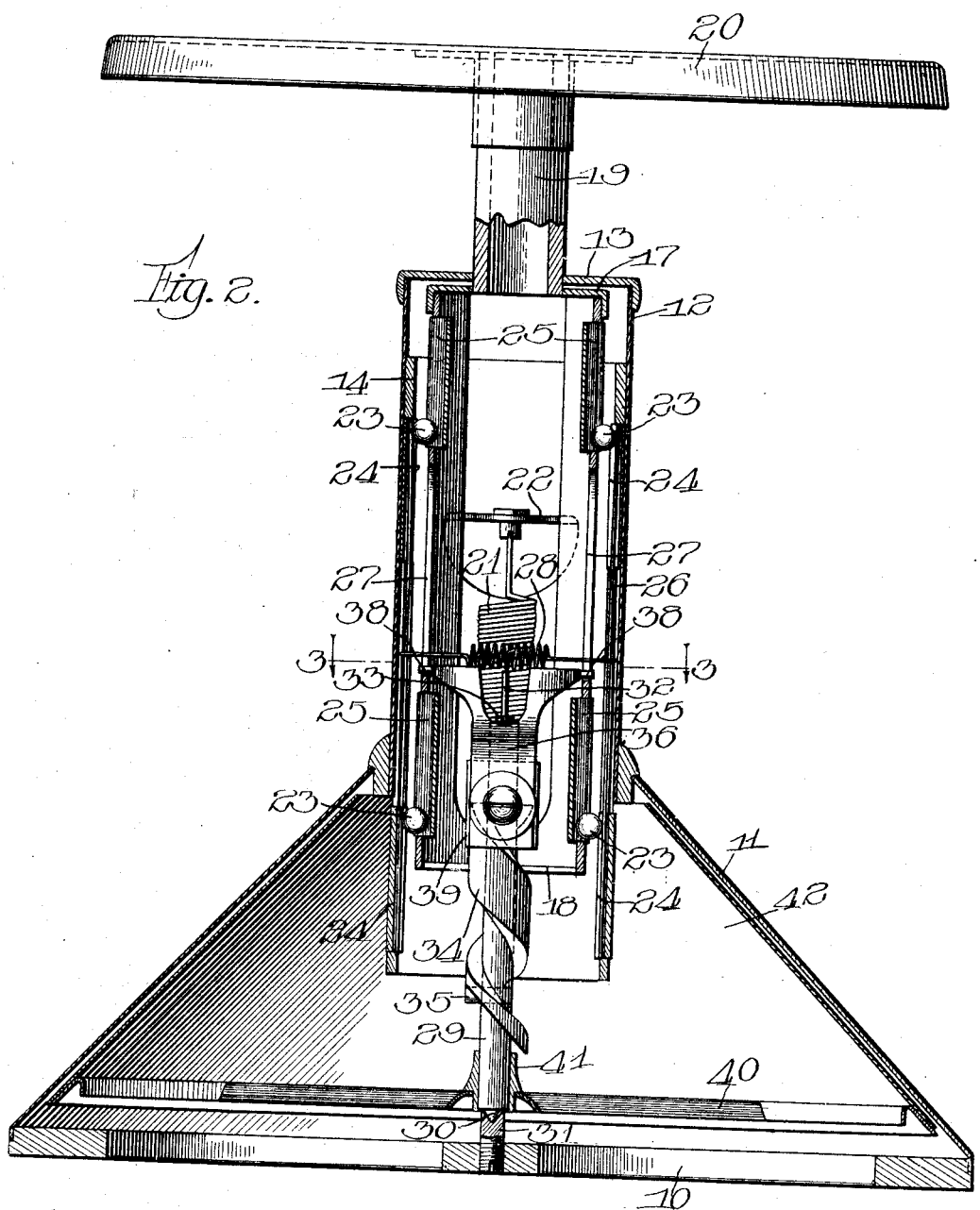

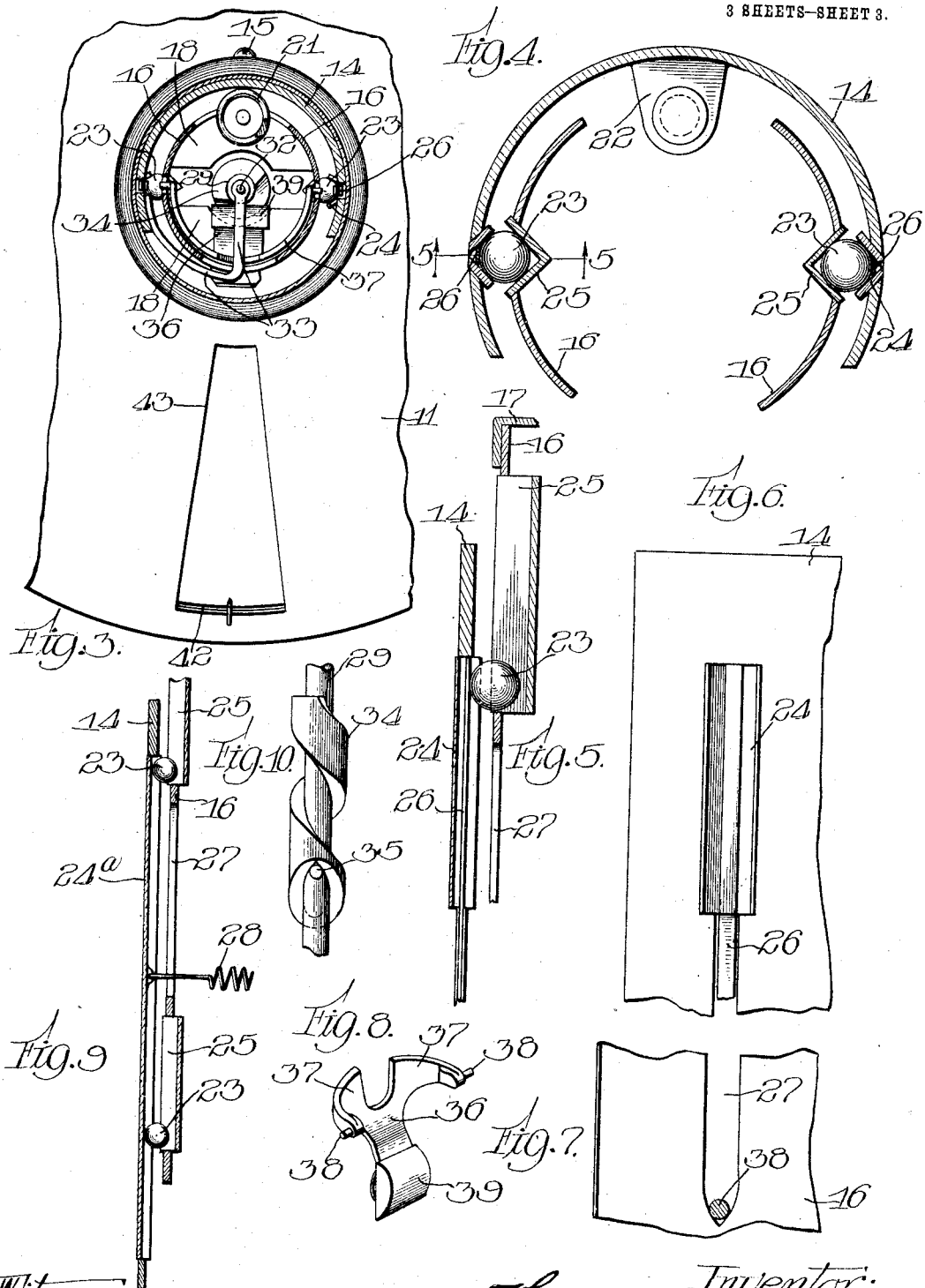

THEODORE C. PROUTY, OF AURORA, ILLINOIS, ASSIGNOR TO WILCOX MANUFACTURING COMPANY, OF AURORA, ILLINOIS, A CORPORATION OF ILLINOIS.

COMPUTING-SCALE.

978,204.  Specification of Letters Patent.  Patented Dec. 13, 1910.

Application filed December 24, 1908. Serial No. 469,101.

*To all whom it may concern:*

Be it known that I, THEODORE C. PROUTY, a citizen of the United States, residing at Aurora, in the county of Kane and State of Illinois, have invented certain new and useful Improvements in Computing-Scales, of which the following is a specification, reference being had to the accompanying drawings.

This invention relates to improvements in computing scales. As such scales are now made the placing of the article to be weighed on the scale platform instantly sets in operation the indicating and computing apparatus and inasmuch as such articles are frequently placed on the scale with more or less violence the mechanism of the machine is jarred and worn and the accuracy of the device is apt to be impaired.

The leading object of my invention is to so construct a device of the character specified that the shock incident to placing an article on the scale cannot be transmitted to the indicating mechanism proper nor to the portion of the mechanism that directly acts thereon, but will prevent such latter portion of the mechanism from performing its function of moving the drum on which the weight figures are marked until after the effect of such shock or jar has been received and absorbed by other parts—after which the said figured drum will be quickly and easily moved to the correct position to indicate the weight of the article.

Another object of my invention is to provide improved means for insuring the easy movement of the part attached to and depending from the scale-platform and at the same time insuring it being moved absolutely vertically at all times.

These objects I accomplish as illustrated in the drawings and hereinafter specifically described.

In the drawings,—Figure 1 is a vertical central section through my improved scale; Fig. 2 is a similar view taken at right angles to the section on which Fig. 1 is taken; Fig. 3 is a cross-section taken on line 3—3 of Fig. 2; Fig. 4 is an enlarged detail, being a cross-sectional view through the operating plunger and the shell in which the plunger moves, showing the anti-friction balls between said parts and the ways in which such balls move; Fig. 5 is a detail, being a vertical section at line 5—5 of Fig. 4; Fig. 6 is a detail, being an inner face view of a portion of the shell in which moves the operating plunger and showing one of the runways carried by said shell and showing also a portion of one of the springs that bear against the anti-friction balls; Fig. 7 is an inner face view of a portion of the operating plunger, illustrating the formation of the slots in which travel the pins on the ends of the device that engages and turns the spiral; Fig. 8 is a perspective view of the above-mentioned spiral-engaging device; Fig. 9 is a detail, showing in vertical section a modification in the means for frictionally engaging the anti-friction balls; and Fig. 10 is a detail, being a view of the spiral device and a portion of the cylindrical rod upon which it is mounted and illustrating more clearly than in the other figures the sharp lower end of the spiral device that insures such spiral device always being dropped to its lowermost position and in proper relation to the pin on said rod so as to insure the drum always being turned to starting or zero position.

In the several figures of the drawings, in which corresponding parts are indicated by like reference characters, 10 indicates a base, to the edge of which is secured the lower portion of the conical casing that incloses the operating mechanism, such casing consisting, in the construction shown, of three principal parts,—namely, a conical-shaped lower portion 11, the lower edge of which is suitably secured to the edge of the base 10; a cylindrical portion 12 that is secured near its lower end in any suitable manner to the upper edge of the portion 11; and a top piece or cap 13 that closes the upper end of the cylindrical portion 12.

14 indicates a semi-cylindrical shell fitting within the cylindrical portion 12 of the inclosing casing, to which it is secured in any suitable manner, as, for example, by one or more screws, one such screw being shown in figure 1 and indicated by 15.

16 indicates two oppositely-located curved arms located within the shell 14, such arms being located opposite each other and each adjacent to the said shell 14. These two arms are to be rigidly connected together at their upper and lower ends in any suitable manner. In the construction shown they are connected together at their upper ends by a cap 17 and at their lower ends by two separated strips 18, as best seen in Fig. 3. The lower end cannot be completely closed as is the upper end because it is necessary to have pass in between the arms 16 certain operating devices hereinafter described. The arms 16 working together as one by reason of their connection at their ends, as stated, may be appropriately termed a plunger. To this plunger at its upper end is connected through the medium of the cap 17 a post 19 to the upper end of which is secured in any suitable manner a platform 20 adapted to receive such articles as are to be weighed on the scale. The plunger is normally held in its raised position through a coiled spring 21 attached at one end to a bracket 22 which, in the construction shown, is formed by suitably cutting the shell 14 to permit a portion of such shell to be turned in between the two arms 16 of the plunger (see Figs. 1 and 4) and the other end of the spring is attached to one of the cross-strips 18 at the lower end of the plunger, as clearly shown in Fig. 1. The attachment of its lower end may be by means of a screw and block, as there shown, or in any suitable manner. The arms 16 of the plunger lie a short distance from the inner face of the shell 14 and between each arm 16 and said shell I interpose anti-friction balls 23, using in the construction shown four of such balls, two opposite each arm 16, one at the upper portion and one at the lower portion of each arm. I form separate runways for each ball, the same consisting of V-shaped strips 24 inserted in slots cut in the shell 14 and V-shaped strips 25 opposite the strips 24 inserted in slots cut in the arms 16. The balls 23 travel freely in these runways.

The amount of movement of the plunger in either direction is regulated by the length of the slots into which the angular runways are set. By providing these runways the plunger is, of course, enabled to move with the least amount of friction, which is desirable in a device of this character. It is essential also, of course, that the plunger move in an absolutely straight vertical line, and ordinarily it would require considerable care and attention to see that the plunger arms fitted with the proper degree of exactness within the shell 14 so as to bear at all times against said anti-friction balls. Such fitting would necessarily be expensive, and I avoid that expense and trouble by providing that the balls shall be at all times pressed equally toward and against the plunger arms. I accomplish this by providing a narrow flat strip 26 lying in the outer runways 24 and being adapted to bear against the anti-friction balls. I provide two of these strips 26, making a single strip long enough to extend from the upper part of one of the upper runways to the lower part of the corresponding runways beneath, as best shown in Fig. 2. These two oppositely-located strips 26 are connected by a light coiled spring 28, the ends of which pass through long narrow slots 27 in the plunger arms 16. The effect of this spring 28 is to at all times keep the strips pressing against the anti-friction balls, and thus there is obviated any rattling of parts that might otherwise occur. This construction insures a smooth, easy running of the plunger, and insures its being always moved in an absolutely vertical direction, and, as before stated, obviates the labor and expense that would be attendant upon making an absolute fit of said plunger within its shell. 29 indicates a cylindrical rod having a bearing point 30 at its lower end (see Fig. 2), which is journaled in the upper end of a suitable bearing 31 projecting centrally above the base 10. This rod projects between the strips 18 that connect the lower ends of the arms 16 of the plunger and is provided at its upper end with a pin 32 that is journaled in the end of a curved arm 33 that is rigidly secured to the shell 14 and projects between the two arms 16 of the plunger, as clearly shown in Fig. 3. On this smooth cylindrical rod 29 is loosely placed a spiral 34. The spiral is, as stated, loosely placed on the rod 29 and is free to be pulled up thereon by the means hereinafter described at the time that the platform and attached plunger are moved up suddenly when the load on the platform is taken off. The lower end of the spiral, however, is provided with two sharply-inclined faces so that when it is allowed to move down on the rod after being pulled up it will always come to its lowermost position notwithstanding the presence of a pin 35 that projects from one side of the rod 29 near its lower end, as shown in Fig. 2. Of course, if the lower end of the spiral was squared the pin would act to hold the spiral entirely above it, but by reason of the sharp incline given to the lower end of the spiral the spiral is bound to drop and its sharply-inclined edge will engage said pin when the spiral itself is rotated, as hereinafter described, and through such engagement will rotate the rod 29.

36 is an arm having at its upper end two curved branches 37, each provided with a short stud or pin 38, and at its lower end provided with a weight-portion 39 of a size and shape adapted to engage the spiral of the part 34 on the rod 29. This arm 36 is movably connected to the plunger by having its studs or pins 38 projecting into the long slots 27 before mentioned. The sides of these slots at their lower ends converge toward each other so that the studs or pins 38 when resting at the lower ends of such slots will rest exactly centrally thereof. 40 indicates a light spider attached by its hub portion 41 in any suitable manner to the cylindrical rod 29 at the lower end of such rod so that when the rod is rotated the spider will, of course, rotate with it. This spider has suitably attached at its edges a drum 42 which, in the construction shown, is conical in shape to correspond to the shape of the portion 11 of the casing. This drum lies close to the inner face of the portion 11 of the casing and is intended to have suitable numbers on its outer face which will be visible through a sight-opening 43 in the said portion 11 of the casing. Along one edge of the sight-opening will be provided numbers indicating pounds. I have not deemed it necessary to show numbers on either the portion 11 of the casing or on the drum 42. The proper arrangement and location of such numbers will be understood by those skilled in the art.

With the parts in position, as shown in Figs. 1 and 2, the operation will be as follows:—The article to be weighed will be placed on the platform 20 and will, of course, at once force down such platform and with it the plunger, and if the article is placed on the platform suddenly, as is generally the case, the plunger and the platform will vibrate slightly for a second or two, as is customary, and will then remain stationary. This sudden downward movement of the plunger will not, however, have the effect of causing a turning of the rod 29, and therefore cannot, of course, cause a turning of the numbered drum 42, which, being fast to such rod, only turns when the rod turns, and this is for the reason that the sudden downward movement of the plunger does not operate to press down the arm 36 which through its weighted end 39 that fits in the groove of the spiral device is the only part that does effect the turning of said rod, but, on the contrary, such sudden downward movement of the plunger simply causes the studs or pins 38 to be brought to a higher position in the long slots 27 in the arms of said plunger. This, of course, leaves the arm 36 entirely unsupported and it then drops by its own weight, during which time its lower weighted end 39 is moving in the spiral groove and causing a turning of such spiral, and this turning causing its inclined lower edge to bear against the projection 35 on the rod 29 which, of course, causes a turning of such rod and also the spider and drum 40—42 connected therewith. The extent of the turning of the spider and drum is, of course, dependent upon the extent to which the weighted end of the arm, 39, travels downward in the spiral. Such downward movement of the arm will continue until its supporting studs or pins 38 are arrested by the closed lower ends of the slots 27 into which they settle centrally owing to the peculiar shape of such lower ends. The arm 36 being weighted, it will always have a tendency to swing inward at such weighted end owing to the studs or pins 38 being located considerably to one side of such weighted end, and this tendency of the weighted end to swing in keeps it constantly in engagement with the spiral groove, and its weight is sufficient to keep turning the spiral device and attached parts until brought to rest by its studs or pins encountering the ends of the slots 27. The weight of the article placed on the platform, of course, determines the extent to which the plunger shall descend, and the spiral is so made that it will always turn just sufficiently to expose the correct reading through the sight-opening in the casing and it cannot turn to expose any numbers beyond the proper numbers because the spiral and the weighted arm 36 are in engagement and the arm cannot move farther down in the spiral because it is held by its studs or pins in the ends of the slots.

Now, when the article to be weighed has been removed from the platform the coiled spring 20 will, of course, act to very quickly or suddenly force up the plunger and its attached platform, and this sudden movement being communicated directly to the weighted arm 36, which is in engagement with the spiral, will draw such arm and the spiral also upward. The weight of the spiral will then cause it to drop—turning, of course, as it is compelled to by reason of its engagement with the weighted end of the arm. In its descent one of its sharply, inclined edges will strike against the projecting pin 35 which acts to so turn the rod and attached drum as to insure the drum being brought to rest always in the same position so as to always present through the sight-opening in the casing the proper zero mark to indicate to observers that the scale is in proper position for again weighing an article.

In Fig. 9 I have shown a slight modification in the means for exerting a constant pressure on the anti-friction balls 23. In the construction already described a long strip 26 is employed long enough to project into a pair of upper and lower runways 24. In the modified form shown in Fig. 9 I dispense with this strip and also dispense with the two runways 24, and in lieu of such runways provide a single long runway 24ª inserted in an opening cut longitudinally in the shell 14 and loose therein. This long runway 24ª being loose is capable of being moved in against the balls and it is held pressed in against the balls by the same light coiled spring 28 employed in the other construction.

By my invention I provide a scale that is well adapted for weighing articles of little or great weight, and one in which all strain and shock, due to suddenly placing a heavy article upon the platform, is absolutely withheld from the revolving drum and its immediate actuating devices and insuring that such actuating devices shall always be brought into operation promptly and effectively, but so gently and easily as to insure but little wear on such parts and also insuring great accuracy under any and all circumstances.

That which I claim as my invention, and desire to secure by Letters Patent, is,—

1. In a scale, the combination with a rotatable indicating member and a rotatable and longitudinally-movable spiral connected therewith, of a gravity-operating device for said spiral, a support for articles to be weighed, and means operated by the depression of said support for permitting said gravity-operating device to fall and rotate said spiral.

2. In a scale, the combination with a plunger, a rotatable spiral and a member connected therewith adapted to have indicating characters thereon, of a device loosely connected to said plunger, and adapted after the descent of the plunger to move down and rotate said spiral.

3. In a scale, the combination with a plunger, a rotatable spiral, and a member connected therewith adapted to have indicating characters thereon, of a device loosely connected to said plunger and having its lower end normally held toward said spiral and adapted after the descent of the plunger to move down and rotate said spiral.

4. In a scale, the combination with a plunger provided with a longitudinal slot, a rotatable spiral and a member connected therewith adapted to have indicating characters thereon, of a device connected with said plunger and movable in the said slot therein, and adapted after the descent of the plunger to move down and rotate said spiral.

5. In a scale, the combination with a plunger provided with a longitudinal slot, the walls of which converge at the lower end of the slot, a rotatable spiral, and a member connected therewith adapted to have indicating characters thereon, of a device connected with said plunger and movable in the said slot therein and adapted after the descent of the plunger to move down and rotate said spiral.

6. In a scale, the combination with a plunger provided with two longitudinal slots, a rotatable spiral and a member connected therewith adapted to have indicating characters thereon, of a device entering said slots and movable therein, said device being adapted after the descent of the plunger to move down and rotate said spiral.

7. In a scale, the combination with a plunger, a spring for holding said plunger normally in a raised position, a rotatable spiral, and a member connected therewith adapted to have indicating characters thereon, of a device loosely connected to said plunger and adapted after the descent of the plunger to move down and rotate the said spiral.

8. In a scale, the combination with a plunger, of a vertical rod, a rotatable member connected with said rod adapted to have indicating characters thereon, a spiral on said rod and longitudinally movable thereof, means for connecting said spiral and rod so that they will rotate together, and a device loosely connected to said plunger and adapted after the descent of the plunger to move down and rotate said spiral.

9. In a scale, the combination with a plunger, of a vertical rod, a rotatable member connected with said rod adapted to have indicating characters thereon, a spiral on said rod and longitudinally movable thereof, said spiral having an inclined lower edge, a projection on said rod against which said inclined edge is adapted to bear, and a device loosely connected to said plunger and adapted after the descent of the plunger to move down and rotate said spiral.

10. In a scale, the combination with a movable indicating member and a vertically-movable spiral operatively engaged therewith when said spiral is in its lowered position, of vertically-movable means adapted when moving downward to engage and turn said spiral and when moved upward to raise said spiral temporarily out of operative engagement with said indicating member.

11. In a scale, the combination with a support for articles to be weighed, a movable indicating member and a vertically-movable spiral operatively engaged with said member when said spiral is in its lowered position, of a gravity-operating device loosely connected with said support and adapted upon the downward movement of said support to engage and turn said spiral and when moved upward with said support to raise said spiral temporarily out of operative engagement with said indicating member.

12. In a scale, the combination with a support for articles to be weighed and a movable indicating member, of a vertically-movable spiral operatively engaging said indicating member when said spiral is in its lowered position, and means connected with said support for causing a rotation of said spiral when said support is moved downward and temporarily disengaging the spiral from the indicating member when said support moves upward, said spiral being adapted to thereafter again operatively engage the indicating member and move it to its original position.

13. In a scale, the combination with a support for articles to be weighed and a movable indicating member, of a vertically-movable spiral operatively engaging said indicating member when said spiral is in its lowered position, and gravity-operated means loosely connected with said support adapted to cause a rotation of said spiral when said support is moved downward and to temporarily disengage the spiral from the indicating member when said support moves upward, said spiral being adapted to thereafter descend by gravity and again operatively engage the indicating member and move it to its original position.

14. In a scale, the combination with a shell and a vertically-movable plunger therein, of a vertical guideway in one of said parts, balls movable in said guideway and adapted to project therefrom in contact with the other of said parts, and a spring pressed strip in said guideway bearing against said balls.

15. In a scale, the combination with a shell and a vertically-movable plunger therein, of a vertical guideway in said plunger, balls movable in said guideway, a strip opposite said guideway adapted to bear against said balls, and a spring attached to said strip, said plunger being slotted to permit the spring to project therethrough.

16. In a scale, the combination with a shell and a vertically-movable plunger therein, of vertical guideways in said shell and plunger, balls movable in said guideways, a strip located in one of said guideways and adapted to bear against said balls, and a spring attached to said strip, said plunger being slotted to permit the spring to project therethrough.

THEODORE C. PROUTY.

Witnesses:
ALBERT H. ADAMS,
MINNIE A. HUNTER.